(12) United States Patent
Umezaki et al.

(10) Patent No.: US 7,310,433 B2
(45) Date of Patent: Dec. 18, 2007

(54) FINGERPRINT VERIFICATION APPARATUS, FINGERPRINT VERIFICATION METHOD AND A FINGERPRINT VERIFICATION PROGRAM

(75) Inventors: Taizo Umezaki, Tajimi (JP); Kenji Miyoshino, Nagoya (JP); Tatsuhiko Sugimoto, Ichinomiya (JP); Toshio Ishizaka, Nagoya (JP)

(73) Assignees: Ume Tech Yugen Kaisha, Nagoya (JP); Kabushiki Kaisha DDS, Nagoya (JP)

( * ) Notice: Subject to any disclaimer, the term of this patent is extended or adjusted under 35 U.S.C. 154(b) by 644 days.

(21) Appl. No.: 10/297,298

(22) PCT Filed: Jul. 11, 2001

(86) PCT No.: PCT/JP01/06029

§ 371 (c)(1), (2), (4) Date: Dec. 4, 2002

(87) PCT Pub. No.: WO02/09034

PCT Pub. Date: Jan. 31, 2002

(65) Prior Publication Data

US 2003/0138136 A1    Jul. 24, 2003

(30) Foreign Application Priority Data

Jul. 24, 2000    (JP)    ............... 2000-227548

(51) Int. Cl.
*G06K 9/00*    (2006.01)
(52) U.S. Cl. .................................... 382/124
(58) Field of Classification Search ............... 382/124, 382/125, 115, 116
See application file for complete search history.

(56) References Cited

U.S. PATENT DOCUMENTS 5,426,708 A    6/1995    Hamada et al.

(Continued)

FOREIGN PATENT DOCUMENTS

EP    0 929 050 A2    7/1999

(Continued)

OTHER PUBLICATIONS

Matsumoto et al., "The Fingerprint Verification Methods Based on the FFT and LPC Analysis", vol. 92, No. 27, pp. 25-31, 1992.

(Continued)

*Primary Examiner*—Bhavesh M Mehta
*Assistant Examiner*—Jonathan Schaffer
(74) *Attorney, Agent, or Firm*—Oliff & Berridge, PLC

(57) ABSTRACT

An overlapped portion of a plurality of partial images of a fingerprint that are input from a fingerprint input device (7) is corrected to be reconfigured at a reconfiguration process section (106). The characteristics are extracted from the input partial images at the fingerprint characteristic information extracting section (110) and the extracted characteristic information is stored in an input characteristic information memory. A verification process section executes DP comparison (dynamic programming method) between the characteristic information stored in the input characteristic information memory and the characteristic information stored in the registered characteristic information memory. The distance value obtained by the DP comparison is compared to a threshold that is previously set. If the distance value is smaller than the threshold, it is judged the fingerprint is identified and if the distance value is larger than the threshold, it is judged that the fingerprint is not identified.

25 Claims, 13 Drawing Sheets

U.S. PATENT DOCUMENTS

| | | | |
|---|---|---|---|
| 5,737,439 A * | 4/1998 | Lapsley et al. | 382/115 |
| 5,933,516 A * | 8/1999 | Tu et al. | 382/125 |
| 6,289,114 B1 * | 9/2001 | Mainguet | 382/124 |
| 6,317,508 B1 | 11/2001 | Kramer et al. | |
| 6,580,816 B2 | 6/2003 | Kramer et al. | |
| 6,718,052 B1 | 4/2004 | Matsumoto et al. | |
| 2001/0043728 A1 | 11/2001 | Kramer et al. | |
| 2002/0012455 A1 * | 1/2002 | Benckert | 382/124 |
| 2002/0181749 A1 | 12/2002 | Matsumoto et al. | |
| 2004/0114784 A1 * | 6/2004 | Fujii | 382/124 |

FOREIGN PATENT DOCUMENTS

| | | |
|---|---|---|
| JP | A 03-168880 | 7/1991 |
| JP | A 10-275233 | 10/1998 |
| JP | A 11-253428 | 9/1999 |

OTHER PUBLICATIONS

Kaneuchi et al., "Development of the Fingerprint Identification Machine", Journal of Information Science, vol. 1, pp. 55-62, 1994.

* cited by examiner

FINGERPRINT VERIFICATION APPARATUS, FINGERPRINT VERIFICATION METHOD AND A FINGERPRINT VERIFICATION PROGRAM

TECHNICAL FIELD

The present invention relates to a fingerprint verification apparatus and a fingerprint verification method and a program for verifying a fingerprint by a computer for identifying a person.

BACKGROUND OF THE INVENTION

Recently, interests have been focused on the security technology for controlling access to information as the rapid progress is made in the electronic information and the network information. As one of the security technology, various products for identifying a person by fingerprint verification have been proposed.

For identifying a person, after a fingerprint image is firstly input by a fingerprint sensor, the input fingerprint image is necessary to be verified with registered fingerprint images. As fingerprint verification methods, the characteristic extracting verification method (Minutia(e) matching) and the image matching method (pattern matching method) are conventionally known.

In the characteristic extracting verification method, the structure of the terminations or the bifurcations of the raised portion (ridge) of the fingerprint is extracted as the characteristics (minutia) and the characteristics are compared to verify the fingerprint. The characteristics are extracted after the noise is removed from the input fingerprint image and the image processing such as the contrast processing or the processing of making fine lines is executed. In this method, various rules are included in the program so as not to extract the false characteristics according to the condition of fingers when inputted and the image processing. Therefore, the program includes a complicated algorism and the verification processing time may be varied.

In the image matching method, the similarity of the fingerprint image is directly compared. Because the similarity is checked by shifting the registered fingerprint image and the input fingerprint image, the verification process can be executed relatively fast. However, since the fingerprint image is input and stored, the fingerprint image may be electrically copied. Therefore, it is necessary to settle the security problems.

However, in those conventional methods, either the characteristics are extracted with respect to an image of a whole fingerprint or the whole image is used for verification, so it is required to have a large amount of memory for storing the whole image and a large amount of computing. Therefore, there have been problems in reducing the size of the apparatus and reducing the cost.

To solve the above problems, an object of the present invention is to provide a fingerprint verification apparatus, a fingerprint verification method and a fingerprint verification program for being capable of verifying a fingerprint by extracting a characteristic information from a partial image of a fingerprint without storing a whole image of the fingerprint.

DISCLOSURE OF THE INVENTION

A fingerprint verification apparatus of this invention for verifying a fingerprint based on an input image of a fingerprint comprises characteristic information extracting means for computing and extracting a characteristic information from a partial image of a fingerprint and identifying means for identifying the fingerprint on the basis of the characteristic information extracted by the characteristic information extracting means.

According to the above-structured fingerprint verification apparatus, since the characteristic information is extracted from the partial image for identifying the fingerprint, it is not necessary to store a whole image of the fingerprint. Therefore, a large amount of memory for storing the image of whole fingerprint is not necessary. Further, the image of whole fingerprint may not be electronically copied. Since the partial image is defined in small, the calculation amount for obtaining the characteristic information can be reduced. If the characteristic information extracting process is executed separately from the identifying process, the processes can be executed simultaneously and the whole processes can be executed fast.

In addition to the above structure, the fingerprint verification apparatus of the present invention may have fingerprint input means for inputting a partial image of the fingerprint, and image process means for comparing a plurality of partial images of fingerprints inputted by the fingerprint input means and removing an overlapped portion. The characteristic information extracting means may extract the characteristic information from the partial image of the fingerprint where the overlapped portion is removed by the image process means.

In the fingerprint verification apparatus, a plurality of partial images that are input one after another are combined and the overlapped portions are removed to be reconfigured. Therefore, it can be prevented that the characteristic information is extracted repeatedly from the overlapped portion. Load for extracting the characteristic information can be reduced.

The fingerprint verification apparatus of the present invention may have storing means for storing a characteristic information of at least one and the identifying means may compare and verify the at least one characteristic information stored by the storing means with at least one characteristic information that is extracted by the characteristic information extracting means to identify the fingerprint.

In the fingerprint verification apparatus, since the fingerprint can be identified by comparing and verifying the stored characteristic information of a partial image with the characteristic information of an input partial image, it is not necessary to store the characteristic information of the whole fingerprint in the storing means and a volume of the storing means can be reduced.

In the fingerprint verification apparatus of the present invention, the characteristic information extracting means may execute a frequency analysis computing process to extract frequency spectrum information of the partial image of the fingerprint as the characteristic information.

In the above structured fingerprint verification apparatus, the characteristics (minutia) are not extracted from the fingerprint. Information of the ridge is processed by the frequency analysis computing process to obtain the characteristic information. Therefore, a preprocessing time of the image can become short and the process can be executed fast. Moreover, there is no difference in difficulty of extracting of the characteristics caused by a condition of a finger when an image is inputted. Therefore, the process time can be stable.

In the fingerprint verification apparatus of the present invention, the characteristic information extracting means may use one of a linear predictive coding (LPC) computing process, a group delay spectrum (GDS) computing process and a fast Fourier transform (FFT) computing process as the frequency analysis computing process.

In the above structured fingerprint verification apparatus, a characteristic information can be extracted easily and fast to execute the fingerprint verification process by using the known frequency analysis computing process such as voice analysis for extracting a characteristic information.

In the fingerprint verification apparatus of the present invention, the fingerprint input means may input a line image of more than or equal to one image line as a partial image of a fingerprint and the image process means may detect an overlapped image line from the two partial images of a fingerprint that are continuously input by the fingerprint input means and may remove the overlapped image line from one of the partial images of the fingerprint.

In the above structured fingerprint verification apparatus, since the image process means processes and reconfigures every two input partial images, the memory amount for storing the input partial images can be minimum. Further, since the input operation and the image process can be executed at the same time, the operation can be executed fast.

The fingerprint verification apparatus of the present invention, the image process means may execute an image reduction process in at least one of a raster direction and a line direction of the partial image of the fingerprint where the overlapped portion is removed.

In the above structured fingerprint verification apparatus, for example when the image reduction process is executed in a raster direction in case that the LPC calculation process is used for extracting the characteristic information, the dimension necessary for the calculation is decreased. Therefore, the memory amount for storing the characteristic information can be decreased. When the image reduction process is executed in a line direction, the number of times for calculating the characteristic information is decreased. Therefore, the memory amount for storing the characteristic information can be decreased.

The fingerprint verification apparatus of the present invention, the identifying means may use the DP method (dynamic programming method).

In the above structured fingerprint verification apparatus, even if the detection accuracy of the movement amount is low and the whole length of the fingerprint is different between the characteristic information of the registration time and the verification time, the difference between the length of the fingerprints that are to be verified is absorbed and the verification of the fingerprints can be executed.

A fingerprint verification method of the present invention for verifying a fingerprint based on an input image of a fingerprint comprises a characteristic information extracting step of computing and extracting a characteristic information from a partial image of a fingerprint and an identifying step of identifying the fingerprint on the basis of the characteristic information extracted at the characteristic information extracting step.

In the above structured fingerprint verification method, since the characteristic information that is extracted from the partial image is used for identifying the fingerprint, it is not necessary to store a whole image of the fingerprint. Therefore, a large amount of memory for storing the image of whole fingerprint is not necessary. Further, the image of whole fingerprint may not be electronically copied. Since the partial image is defined in small, the calculation amount for obtaining the characteristic information can be reduced.

If the characteristic information extracting process is executed separately from the identifying process, the processes can be executed simultaneously and the whole processes can be executed fast.

The fingerprint verification method of the present invention may have a fingerprint inputting step of inputting a partial image of the fingerprint and image processing step of comparing a plurality of partial images of fingerprints inputted at the fingerprint inputting step and removing an overlapped portion. At the characteristic information extracting step the characteristic information may be extracted from the partial image of the fingerprint where the overlapped portion is removed at the image processing step.

In the above structured fingerprint verification method, a plurality of partial images that are input one after another are combined and the overlapped portions are removed to be reconfigured. Therefore, it can be prevented that the characteristic information is extracted repeatedly from the overlapped portion. Load for extracting the characteristic information can be reduced.

The fingerprint verification method of the present invention may have a storing step of storing a characteristic information of at least one, and at the identifying step the at least one characteristic information stored at the storing step may be compared and verified with at least one characteristic information that is extracted at the characteristic information extracting step to identify the fingerprint.

In the above structured fingerprint verification method, since the fingerprint can be identified by comparing and verifying the stored characteristic information of a partial image and the characteristic information of the input partial image, the characteristic information of the whole fingerprint is not necessary to be stored.

According to the fingerprint verification method of the present invention, at the characteristic information extracting step a frequency analysis computing process may be executed to extract frequency spectrum information of the partial image of the fingerprint as the characteristic information.

In the above structured fingerprint verification method, the characteristics (minutia) are not extracted from the fingerprint. Information of the ridge is processed by the frequency analysis computing process to obtain the characteristic information. Therefore, a preprocessing time of the image can become short and the process can be executed fast. Moreover, there is no difference in difficulty of extracting of the characteristics caused by a condition of a finger when an image is inputted. Therefore, the process time can be stable.

According to the fingerprint verification method of the present invention, at the characteristic information extracting step, one of a linear predictive coding (LPC) computing process, a group delay spectrum (GDS) computing process and a fast Fourier transform (FFT) computing process may be used as the frequency analysis computing process.

In the above structured fingerprint verification method, the characteristic information can be extracted easily and fast to execute the fingerprint verification process by using the known frequency analysis computing process such as voice analysis.

According to the fingerprint verification method of the present invention, at the fingerprint inputting step, a line image of more than or equal to one image line may be input as a partial image of a fingerprint and at the image processing step an overlapped image line may be detected from the two partial images of a fingerprint that are continuously input at the fingerprint inputting step and the overlapped image line is removed from one of the two partial images of the fingerprint.

In the above structured fingerprint verification method, since every two inputted partial images are processed and reconfigured, the memory amount for storing the input partial images can be minimum. Further, since the input operation and the image process can be executed at the same time, the operation can be executed fast.

According to the fingerprint verification method of the present invention, at the image processing step, an image reduction process may be executed in at least one of a raster direction and a line direction of the partial image of the fingerprint where the overlapped portion is removed.

In the above structured fingerprint verification method, for example when the image reduction process is executed in a raster direction in case that the LPC calculation process is used for extracting the characteristic information, the dimension necessary for the calculation is decreased. Therefore, the memory amount for storing the characteristic information can be decreased. When the image reduction process is executed in a line direction, the number of times for calculating the characteristic information is decreased. Therefore, the memory amount for storing the characteristic information can be decreased.

According to the fingerprint verification method of the present invention, at the identifying step, the DP method (dynamic programming method) may be used.

In the above structured fingerprint verification method, even if the detection accuracy of the movement amount is low and the whole length of the fingerprint is different between the characteristic information of the registration time and the verification time, the difference between the length of the fingerprints that are to be verified is absorbed and the verification of the fingerprints can be executed.

A fingerprint verification program of the present invention for executing verification of a fingerprint based on an input image of a fingerprint comprises a characteristic information extracting step of computing and extracting a characteristic information from a partial image of a fingerprint and an identifying step of executing the characteristic information extracting step with respect to more than or equal to one partial image of a fingerprint to extract a partial characteristic information of the fingerprint and identifying the fingerprint on the basis of the partial characteristic information.

In the above structured fingerprint verification program, since the characteristic information that is extracted from the partial image is used for identifying the fingerprint, it is not necessary to store a whole image of the fingerprint. Therefore, a large amount of memory for storing the image of whole fingerprint is not necessary. Further, the image of whole fingerprint may not be electronically copied. Since the partial image is defined in small, the calculation amount for obtaining the characteristic information can be reduced. If the characteristic information extracting process is executed separately from the identifying process, the processes can be executed simultaneously and the whole processes can be executed fast.

The fingerprint verification program of the present invention may have a fingerprint inputting step of inputting a partial image of the fingerprint and image processing step of comparing a plurality of partial images of fingerprints inputted at the fingerprint inputting step and removing an overlapped portion. At the characteristic information extracting step the characteristic information may be extracted from the partial image of the fingerprint where the overlapped portion is removed at the image processing step.

In the above structured fingerprint verification program, a plurality of partial images that are input one after another are combined and the overlapped portions are removed to be reconfigured. Therefore, it can be prevented that the characteristic information is extracted repeatedly from the overlapped portion. Load for extracting the characteristic information can be reduced.

The fingerprint verification program of the present invention may further have a storing step of storing a characteristic information of at least one, and at the identifying step the at least one characteristic information stored at the storing step is compared and verified with at least one characteristic information that is extracted at the characteristic information extracting step to identify the fingerprint.

In the above structured fingerprint verification program, since the fingerprint can be identified by comparing and verifying the stored characteristic information of the partial image and the characteristic information of the input partial image, the characteristic information of the whole fingerprint is not necessary to be stored.

According to the fingerprint verification program of the present invention, at the characteristic information extracting step a frequency analysis computing process is executed to extract frequency spectrum information of the partial image of the fingerprint as the characteristic information.

In the above structured fingerprint verification program, the characteristics (minutia) are not extracted from the fingerprint. Information of the ridge is processed by the frequency analysis computing process to obtain the characteristic information. Therefore, a preprocessing time of the image can be short and the process can be executed fast. Moreover, there is no difference in difficulty of extracting of the characteristics caused by a condition of a finger when an image is inputted. Therefore, the process time can be stable.

According to the fingerprint verification program of the present invention, at the characteristic information extracting step, one of a linear predictive coding (LPC) computing process, a group delay spectrum (GDS) computing process and a fast Fourier transform (FFT) computing process may be used as the frequency analysis computing process.

In the above structured fingerprint verification program, the characteristic information can be extracted easily and fast to execute the fingerprint verification process by using the known frequency analysis computing process such as voice analysis.

According to the fingerprint verification program of the present invention, at the fingerprint inputting step, a line image of more than or equal to one image line is input as a partial image of a fingerprint and at the image processing step an overlapped image line is detected from the two partial images of a fingerprint that are continuously input at the fingerprint inputting step and the overlapped image line is removed from one of the partial images of the fingerprint.

In the above structured fingerprint verification program, since every two inputted partial images are processed and reconfigured, the memory amount for storing the input partial images can be minimum. Further, since the input operation and the image process can be executed at the same time, the operation can be executed fast.

According to the fingerprint verification program of the present invention, at the image processing step, an image reduction process may be executed in at least one of a raster direction and a line direction of the partial image of the fingerprint where the overlapped portion is removed.

In the above structured fingerprint verification program, for example when the image reduction process is executed in a raster direction in case that the LPC calculation process is used for extracting the characteristic information, the dimension necessary for the calculation is decreased. Therefore, the memory amount for storing the characteristic information can be decreased. When the image reduction process is executed in a line direction, the number of times for calculating the characteristic information is decreased. Therefore, the memory amount for storing the characteristic information can be decreased.

According to the fingerprint verification program of the present invention, at the identifying step, the DP verification method (dynamic programming method) is used.

In the above structured fingerprint verification program, even if the detection accuracy of the movement amount is low and the whole length of the fingerprint is different between the characteristic information of the registration time and the verification time, the difference between the length of the fingerprints that are to be verified is absorbed and the verification of the fingerprints can be executed.

BEST MODE FOR CARRYING OUT THE INVENTION

Figure 1:
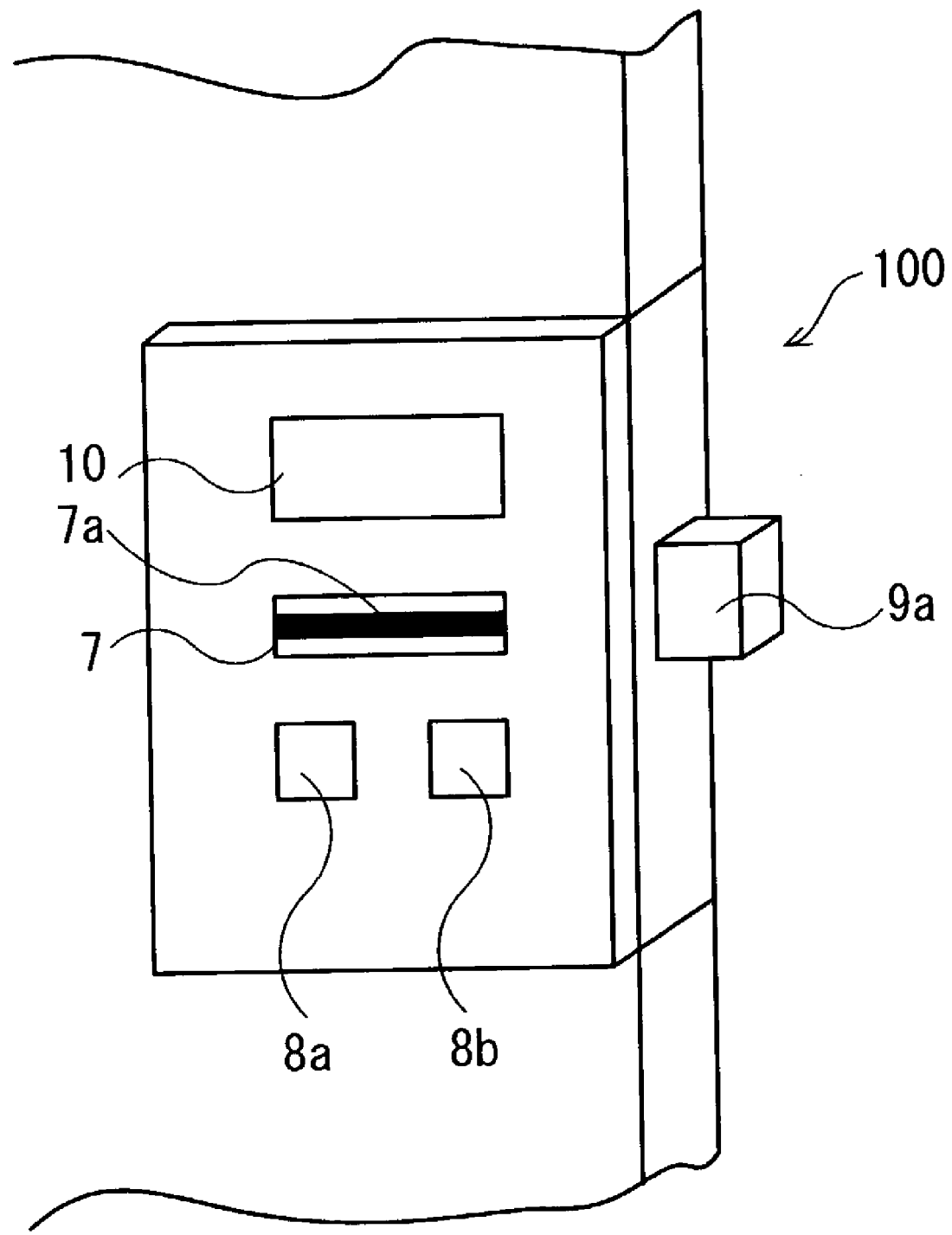
FIG. 1 is an outward appearance view of an electronic lock of one embodiment.
Figure 2:
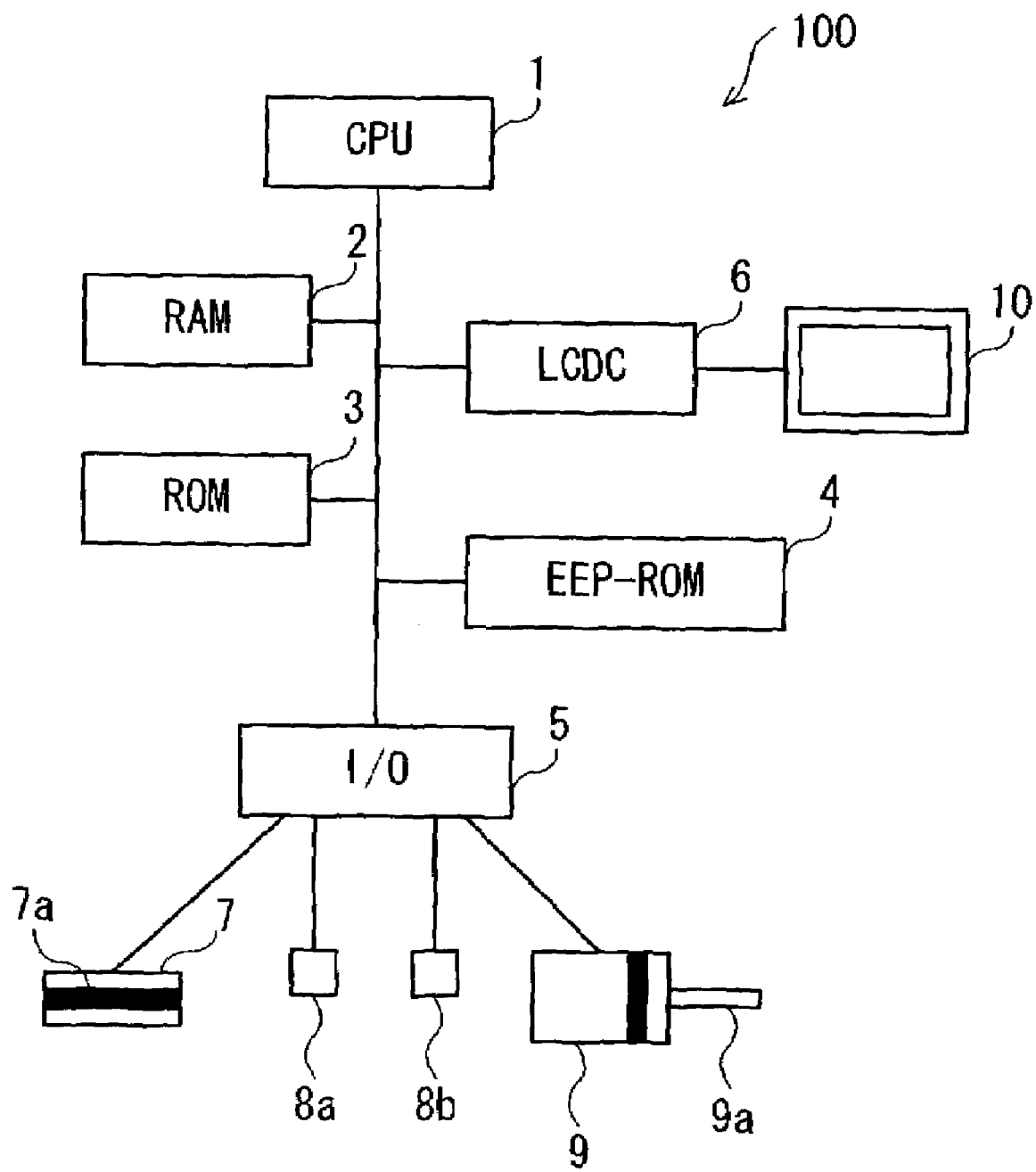
FIG. 2 is a block diagram showing an electric structure of the electronic lock of the embodiment.

Hereinafter, one embodiment of the present invention that is applied to an electronic lock where a fingerprint verification apparatus is mounted will be explained with reference to the drawings. As shown in FIG. 1, the electronic lock 100 has a fingerprint input device 7, switches 8 (a fingerprint registration switch 8a and a fingerprint erasing switch 8b) and a liquid crystal display 10. The electronic lock 100 is mounted to a door and the electronic lock 100 is locked by a plunger 9a that is moved by an electromagnetic solenoid 9 (referring to FIG. 2). As shown in FIG. 2, the electronic lock 100 of the embodiment is structured by an electronic circuit including a CPU 1 and has a RAM 2, a ROM 3, an EEP-ROM 4, the fingerprint input device 7, the switches 8, an input/output (I/O) port 5 for connecting the electromagnetic solenoid 9 and the CPU 1, a liquid crystal display controller (LCDC) 6 for controlling the liquid crystal display 10 and an electric power source device such as a battery (not shown).

Figure 4:
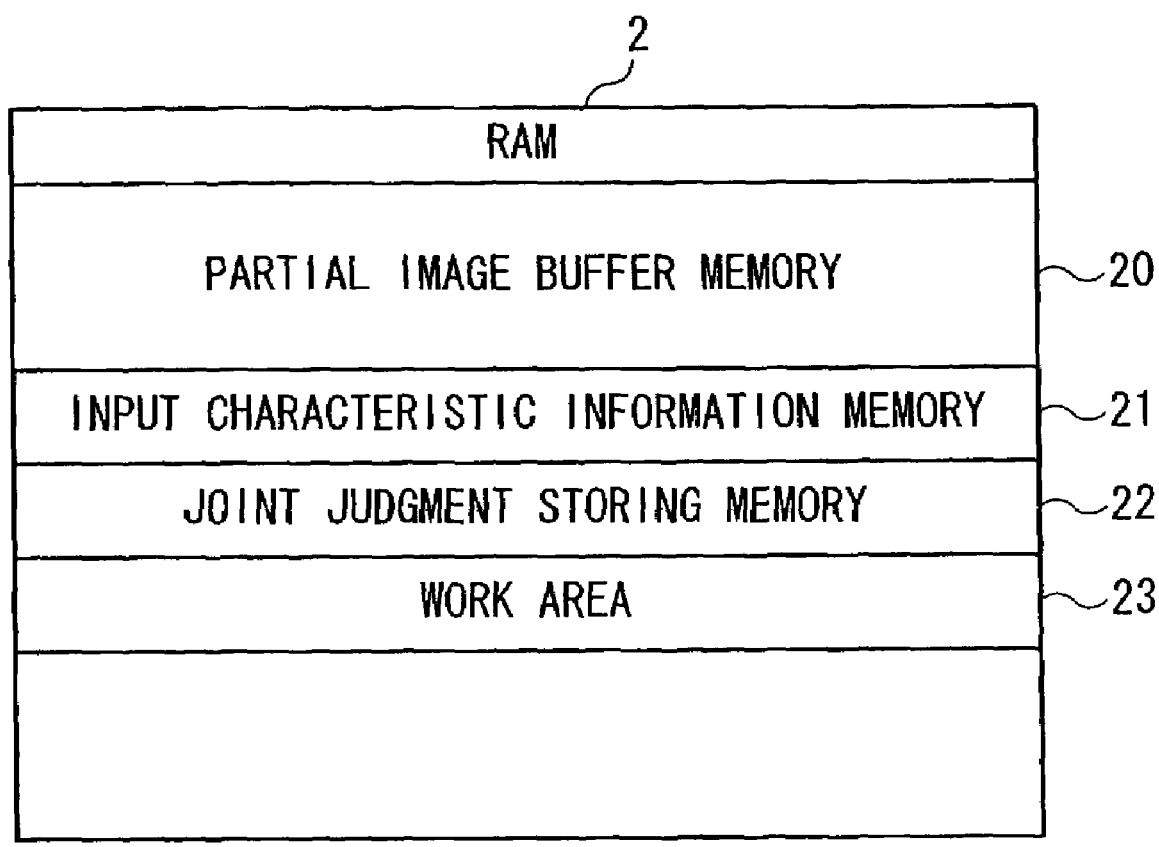
FIG. 4 is a diagrammatic view showing a storing area of a RAM 2.

As shown in FIG. 4, the RAM 2 includes a partial image buffer memory 20 for storing a slice image of a fingerprint input by the fingerprint input device 7, an input characteristic information memory 21 for storing a characteristic information of the input fingerprints, a joint judgment storing memory 22 for storing computing result for judging the joint portions and a work area 23 for temporary storing various data. A finger print verification program and various programs are stored in the ROM 3 and the electronic lock 100 is controlled when the CPU 1 executes a corresponding program.

Figure 5:
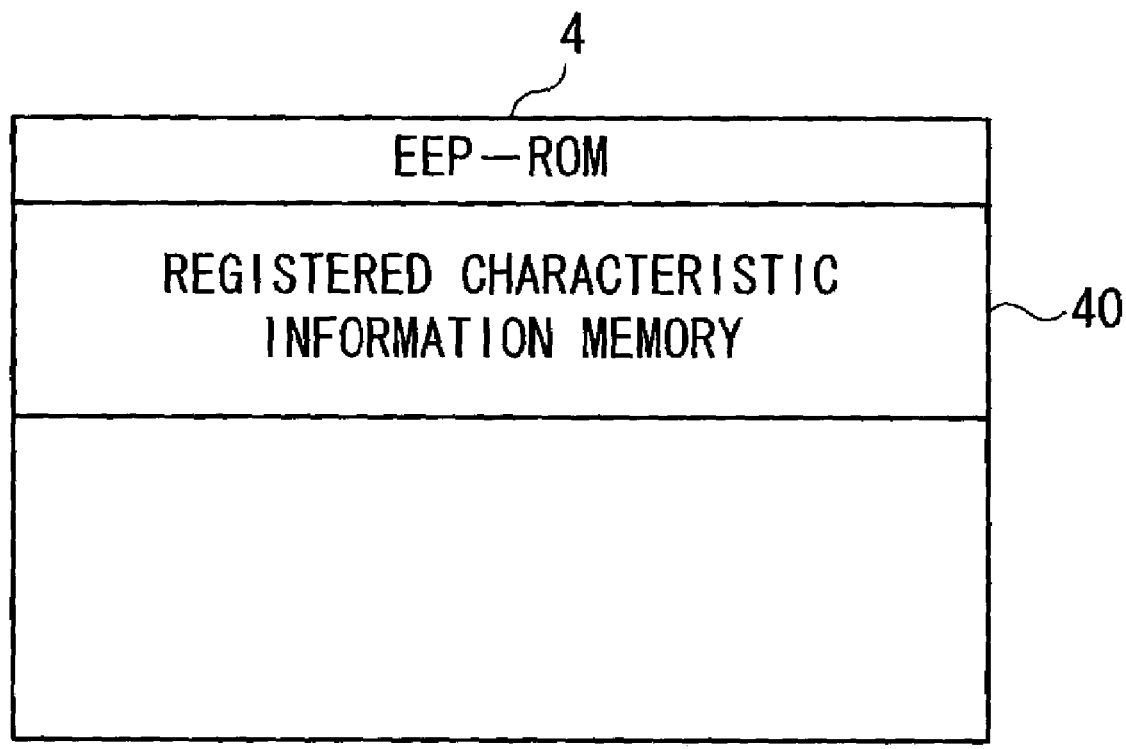
FIG. 5 is a diagrammatic view showing a storing area of an EEP-ROM 4.

As shown in FIG. 5, the EEP-ROM 4 has a registered characteristic information memory 40 for storing a characteristic information of a registered fingerprint. Since the EEP-ROM 4 is a non-volatile memory, the stored data can be maintained even when the supply of the electric power is stopped. For the EEP-ROM 4, a non-volatile memory such as a flash memory or the like can be used instead of a normal EEP-ROM.

Figure 3:
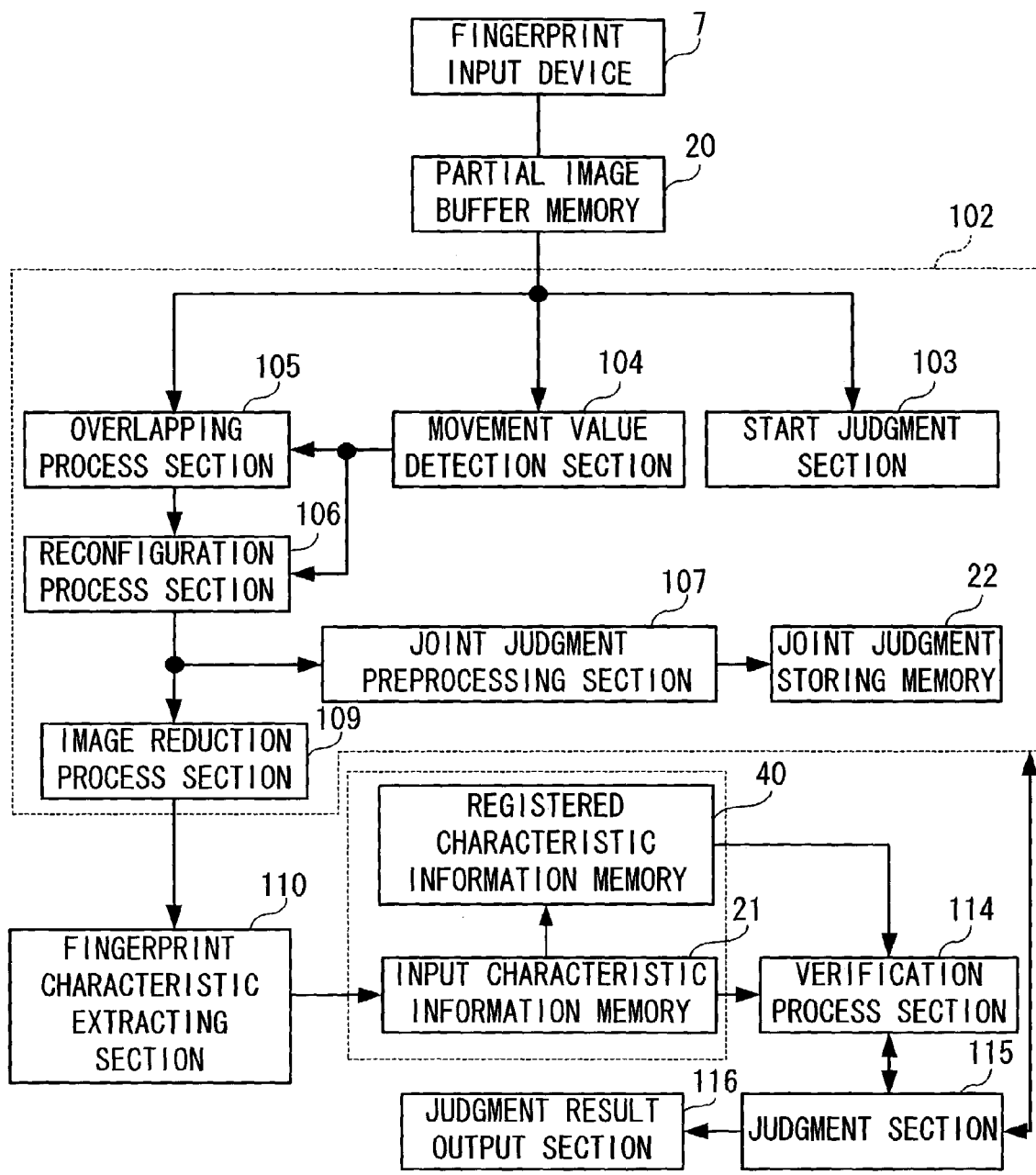
FIG. 3 is a block diagram showing an electric structure of a fingerprint verification apparatus.

As shown in FIG. 3, the fingerprint verification apparatus mounted in the electronic lock 100 includes the fingerprint input device 7; an image process section 102; a fingerprint characteristic information extracting section 110; a verification process section 114; a judgment section 115; a judgment result output section 116; a partial image buffer memory 20, an input characteristic information memory 21, and a joint judgment storing memory 22 provided in the RAM 2; and a registered characteristic information memory 40 of the EEP-ROM 4.

Figure 6:
FIG. 6 is an example view of an input partial image.

The fingerprint input device 7 includes a sensor 7a and an A/D converter (not shown) and outputs an input partial image representing temperature change of a finger that moves on the sensor 7a and the input partial image is stored in the partial image buffer memory 20 of the RAM 2. In the embodiment, the input partial image is formed in a linear shape of 280 pixels in a horizontal direction and 8 pixels in a vertical direction and the input partial image is output more than or equal to 200 times a second. One example of the input partial image is shown in FIG. 6.

The image process section 102 executes a previous operation so that a characteristic information can be extracted from the input partial image. The image process section 102 includes a start judgment section 103, a movement value detection section 104, an overlapping process section 105, a reconfiguration process section 106, a joint judgment preprocessing section 107, a joint judgment storing memory 22 and an image reduction process section 109.

The start judgment section 103 extracts a center portion (64 pixels in a horizontal direction and 4 pixels in a vertical direction in the embodiment) from continuous two input partial images that are obtained by the fingerprint input device 7 and computes difference of a picture element value at a same portion as an absolute value. When the number of times that the difference value exceeds a threshold reaches more than or equal to a predetermined number of times, it is judged that a finger moves on the fingerprint input device 7 and data is started to be stored in the joint judgment storing memory 22 and the input characteristic information memory 21. When the number of times that the difference value becomes lower than the threshold reaches more than or equal to a predetermined number of times, it is judged that the finger is apart from the input device and the data is stopped to be stored in each memory. Afterwards, the verification is operated with the verification process section 114.

The movement detection portion 104 extracts a center portion (64 pixels in a horizontal direction and 8 pixels in a vertical direction in the embodiment) of one of the continuous two input partial images that are input by the fingerprint input device 7. Next, the movement value detection portion 104 extracts a portion of a same size as the center portion from the another input partial image. The portion to be extracted is obtained by shifting with an assumed movement value. Difference between the picture element values of the same portion in the extracted partial images is computed as the absolute value and the obtained value is considered as image difference. This process is repeatedly executed for the assumed movement value. When the image difference becomes minimum, the movement value at this time is considered as output as a detection result of the movement value of the finger that moves on the sensor 7a.

The overlapping process section 105 adds the value in the memory and the value of the input image to store in the same portion with respect to the position of the buffer memory from by shifting the input partial image that is obtained by the fingerprint input device 7 by the movement value obtained by the movement value detection portion 104. Thus, the images are overlapped with each other. At this time, the number of overlapping times is also stored in the buffer memory.

Figure 7:
FIG. 7 is an example view of an image that is obtained by a reconfiguration process section 106.
Figure 8:
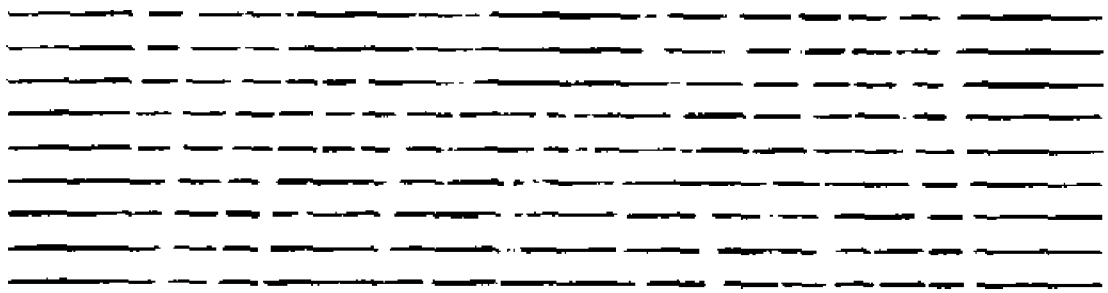
FIG. 8 is an example view showing nine continuous partial images output from the reconfiguration process section 106 that are aligned with each other.

The reconfiguration process section 106 reconfigures the image obtained by the fingerprint input device 7 based on the movement value obtained by the movement value detection section 104 to output a partial image (280 pixels in a horizontal direction and 1 pixel in a vertical direction in this embodiment) as an unit. FIG. 7 shows an example when the whole image is obtained by the reconfiguration process section 106. FIG. 8 shows an example when nine continuous partial images that are output from the reconfiguration process section 106 are aligned with each other.

The joint judgment preprocessing section 107 executes a part of computing necessary for judging the joint portion of a finger that moves on the sensor 7a and outputs the computing result to store it in the joint judgment storing memory 22. First, sobel transform is executed to the input image to emphasize the characteristics of the fingerprint. Next, gauss transform is executed to decrease noise picture elements. Next, one line (256 pixels in a horizontal direction and 1 pixel in a vertical direction in this embodiment) is extracted and the number of picture elements whose picture element value exceeds the threshold is measured. This is a process result of the line. The value is proportional to the area where the finger contacts on the sensor 7a. It is judged that a part of the small value is a joint and only a portion having effective information is utilized as data for verification. The judgment section 115 judges the position of the joint using the value stored in the joint judgment storing memory 22 after the finger is apart from the sensor 7a and determines an end point of the verification.

The image reduction process section 109 reduces the image output from the reconfiguration process section 106 into an image of ½ in a horizontal direction and ⅓ in a vertical direction. By the reduction in a horizontal direction, the dimension necessary for extracting the characteristics by LPC analysis can be decreased. By the reduction in a vertical direction, the volume of the input characteristic information memory 21 can be reduced without spoiling the verification result.

The fingerprint characteristic extracting section 110 extracts characteristics from the input one line after reduction (128 pixels in a horizontal direction and 1 pixel in a vertical direction in this embodiment) and outputs the characteristic data. In this embodiment, the LPC analysis is executed with the picture element value of the line as signal change.

The input characteristic information memory 21 continuously stores characteristic data output from the fingerprint characteristic information extracting section 110. When the fingerprint verification process is executed, the input characteristic information memory 21 outputs the characteristic data according to the request from the verification process section 114. The registered characteristic information memory 40 of the EEP-ROM 4 stores and maintains the contents of the input characteristic memory 21 when directed to register a fingerprint. When the fingerprint verification process is executed, the registered characteristic information memory 40 outputs the characteristic data according to the request from the verification process section 114.

The verification process section 114 executes DP method to verify the characteristic data stored in the input characteristic information memory 21 with the characteristic data stored in the registered characteristic information memory 40 of the EEP-ROM 4. The minimum distance is represented as distance between the characteristics and outputs as a degree of similarity. The judgment section 115 compares the degree of similarity output from the verification process section 114 with the previously set threshold to execute judgment. The result is output to the judgment result output section 116. The judgment result output section 116 inputs the judgment result output from the judgment section 115 and outputs the judgment result outside of the apparatus.

Next, an operation of the electronic lock 100 of this embodiment will be explained with reference to the flowcharts of FIGS. 9 to 13. Hereinafter, each step of the flowcharts is described as S. In the electronic lock 100 of this embodiment, a fingerprint is registered when the fingerprint registration switch 8a is pressed and a finger is placed on the fingerprint input device 7 and moved in its longitudinal direction so as to be slid. Then the plunger 9a comes out to lock the electronic lock 100. When the finger is placed on the fingerprint input device 7 without pressing the fingerprint registration switch 8a and the finger is moved in its longitudinal direction so as to be slid, the fingerprint verification is executed. If the input fingerprint is identified with a registered fingerprint, the plunger 9a comes back and the electronic lock 100 is unlocked. A fingerprint is input when the fingerprint erase switch 8b is pressed and the finger is placed on the fingerprint input device 7 and moved in its longitudinal direction so as to be slid. In this case, after confirmation is displayed on the liquid crystal display 10, the registered identified fingerprint is erased if the fingerprint erase switch 8b is pressed again.

Figure 9:
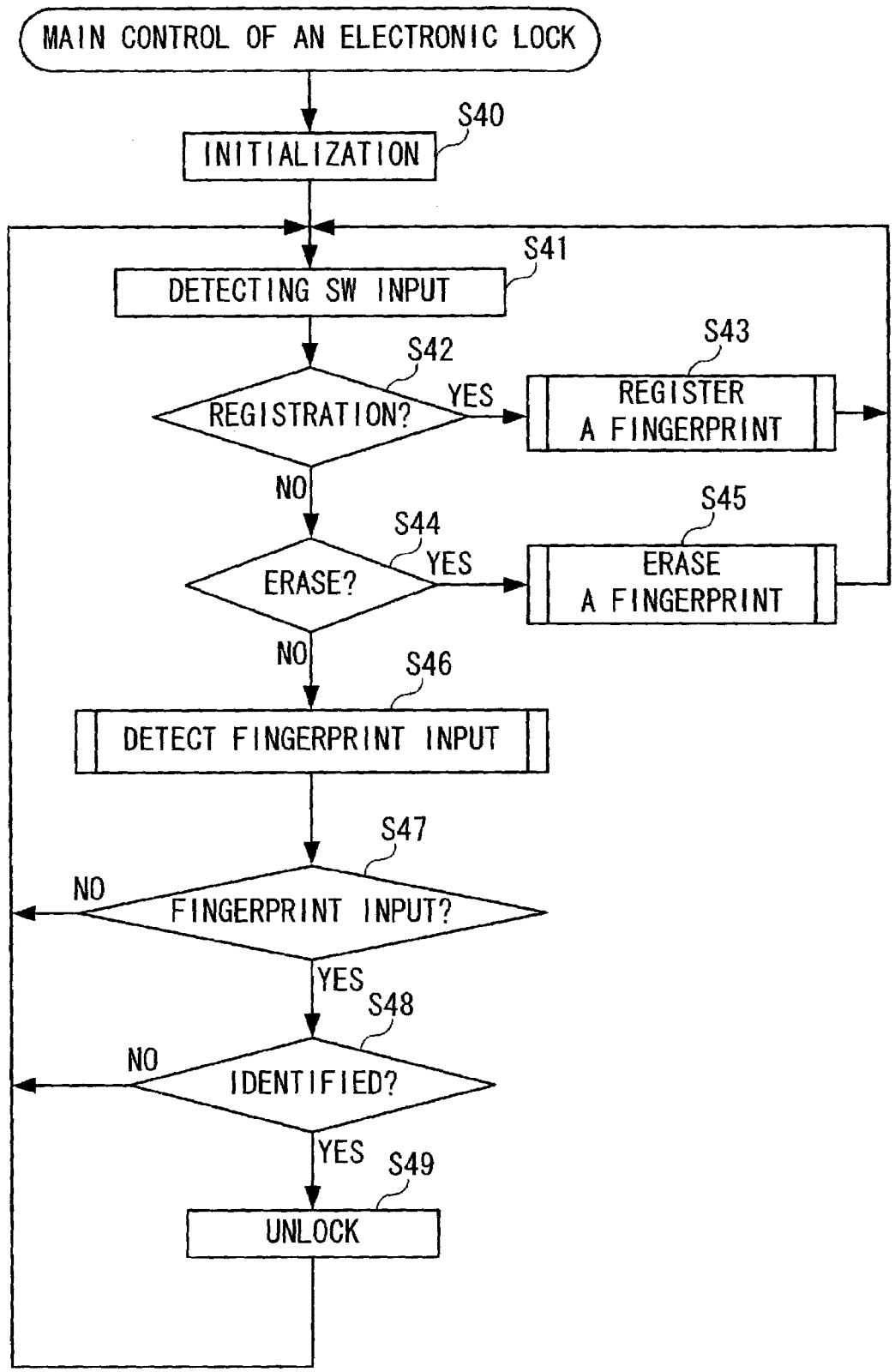
FIG. 9 is a flowchart showing a process flow of the electronic lock.

FIG. 9 is a flowchart showing a whole main control process of the electronic lock 100. First, when an electric power is turned on, the electronic lock 100 is reset and memories and the like in the RAM 2 are initialized (S40). It is detected whether any one of switches 8 is pressed (S41) and if the fingerprint registration switch 8a is pressed (S42:YES), the fingerprint registration process is executed (S43). If the fingerprint erase switch 8b is pressed (S42:NO, S44:YES), the fingerprint erase process is executed (S45). Details of the fingerprint registration process and the fingerprint erase process will be explained later. If any one of the switches is not pressed (S44:NO), it is detected whether a fingerprint is input (S46). Details of the fingerprint input detection process will be explained later. If any fingerprint is not input (S47:NO), the process returns to S41 to detect whether any switch is input. If a fingerprint is input (S47: YES) and it is judged that the input fingerprint is identified with a registered fingerprint (S48:YES), the plunger 9a is pulled back to unlock the electronic lock 100 (S49).

Figure 10:
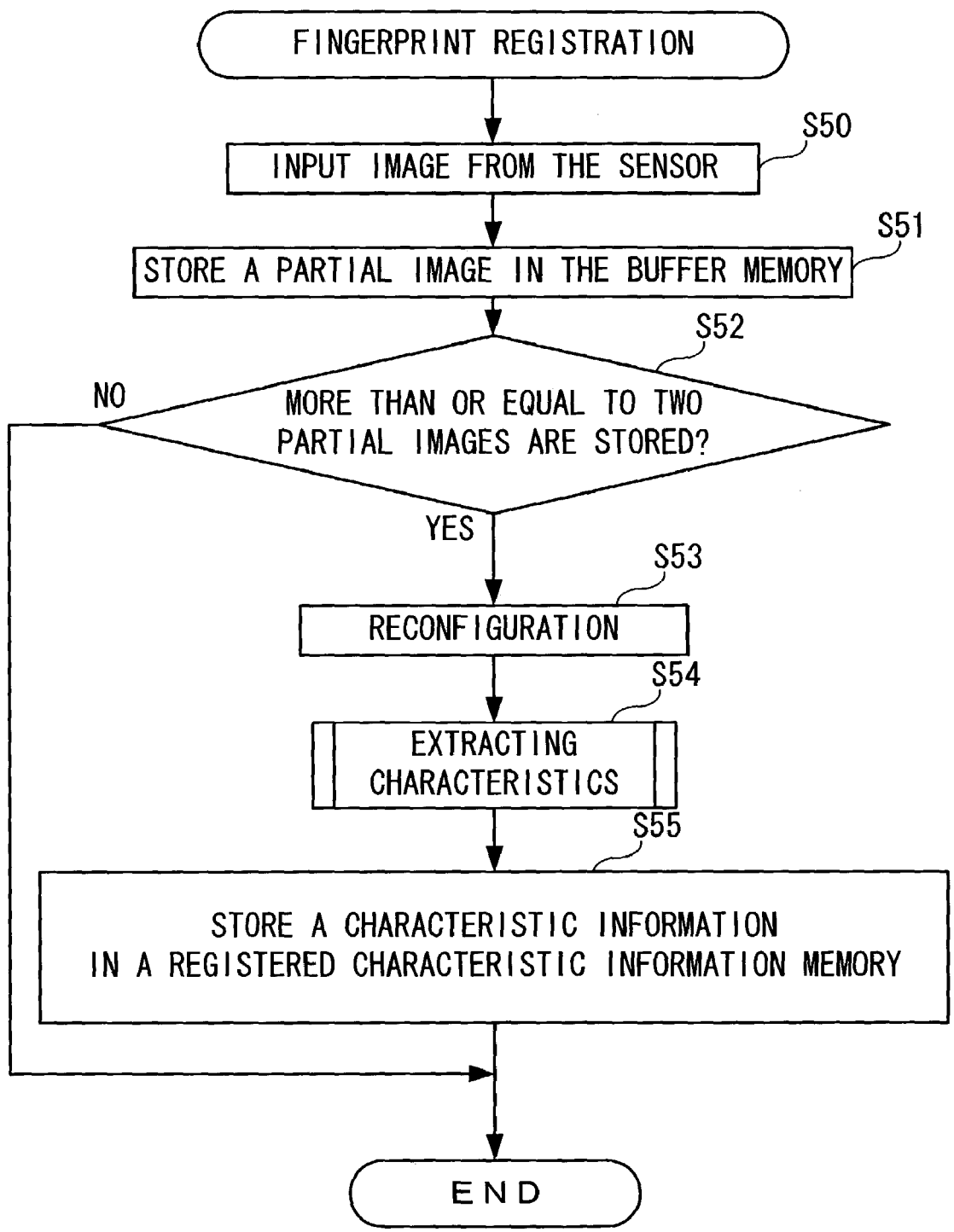
FIG. 10 is a flowchart showing details of a fingerprint registration process.

FIG. 10 is a flowchart showing details of the fingerprint registration process executed at S43 in FIG. 9. When a finger is placed on the fingerprint input device 7 and moved in its longitudinal direction so as to be slid, a partial image shown in FIG. 6 is input from the sensor 7a (S50). Since the sensor 7a detects image input every predetermined time (equal to or more than 200 times a second in this embodiment), one or a plurality of partial images are input depending on the speed that the finger is moved. The input partial image is stored in the partial image buffer memory 20 of the RAM 2 (S51).

If only one partial image input is detected and only one partial image is stored in the partial image buffer memory 20, an error is caused and the process is terminated to return to the main routine (S52:NO). If a plurality of partial images are stored in the buffer memory 20 (S52:YES), the movement value detection section 104 detects the movement value. The reconfiguration process section 106 corrects and reconfigures a portion where the partial images are overlapped based on the detected movement value (S53).

Reconfiguration is executed as follows. The image corresponding to the movement value that is not overlapped with the partial image that is input later (present frame) is separated from the partial image that is input before (old frame) and stored in the work area 23 of the RAM 2. Next, the overlapping process section overlaps the images at the overlapped portion of the old frame and the present frame and the overlapped images are stored in the work area 23 of the RAM 2. A portion where the present frame and the old frame are not overlapped is stored in the work area 23 of the RAM 2. The fingerprint characteristic extracting section 110 extracts the characteristics from the reconfigured partial image (S54) and the characteristics are stored in the input characteristic information memory 21 and also in the registration characteristic information memory 40 of the EEP-ROM 44 (S55). Details of the characteristic information extracting process will be explained later.

Figure 11:
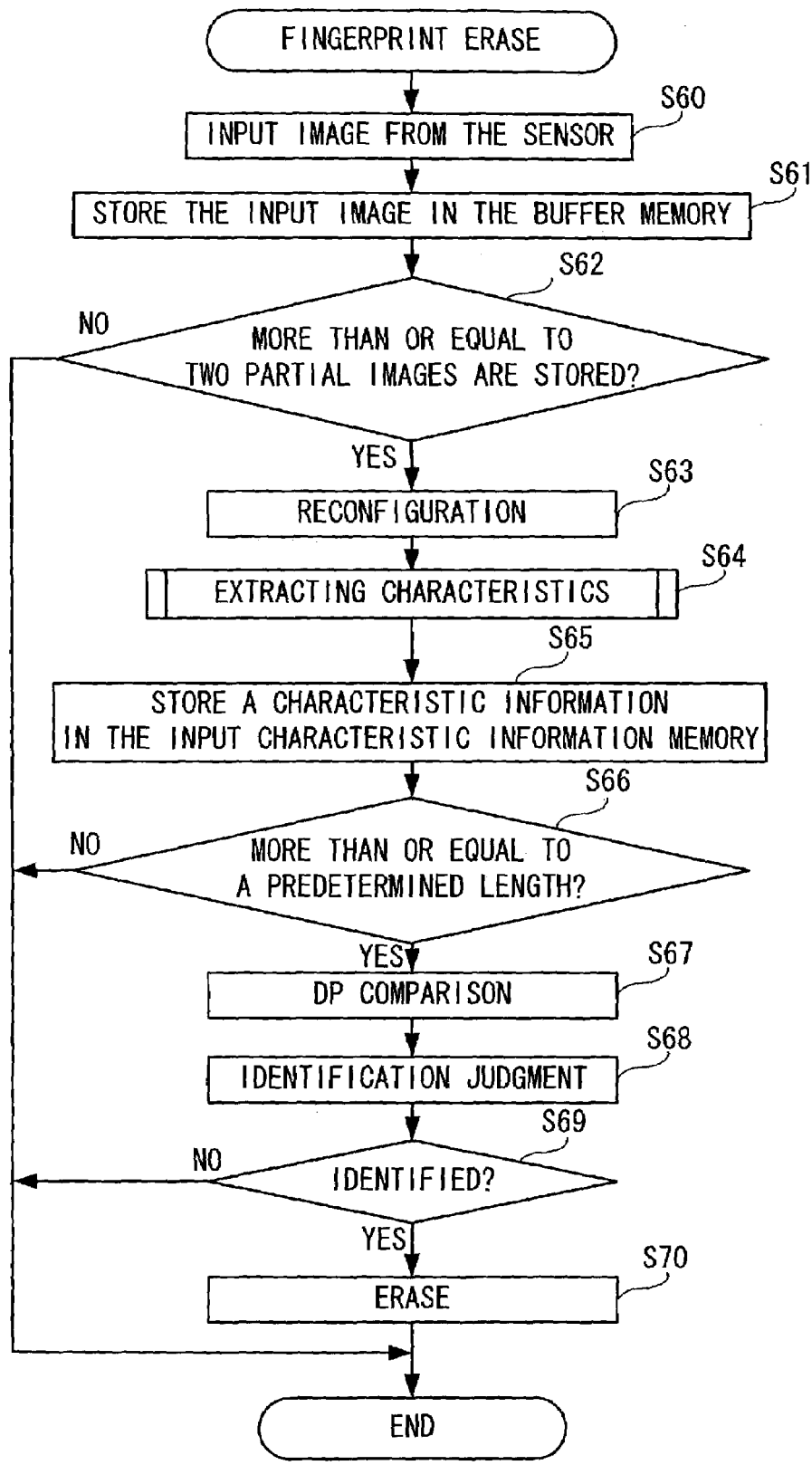
FIG. 11 is a flowchart showing details of a fingerprint erasing process.

FIG. 11 is a flowchart showing details of the fingerprint erase process that is executed at S45 of FIG. 9. When a finger is placed on the fingerprint input device 7 and moved in its longitudinal direction so as to be slid, the partial image shown in FIG. 6 is input from the sensor (S60). Since the sensor detects image input every predetermined time (equal to or more than 200 times a second in this embodiment), one or a plurality of partial images are input depending on the speed that the finger is moved. The input partial image is stored in the partial image buffer memory 20 (S61).

If only one partial image input is detected and only one partial image is stored in the partial image buffer memory 20, an error is caused and the process is terminated to return to the main routine (S62:NO). If a plurality of partial images are stored in the buffer memory 20 (S62:YES), the movement value detection section 104 detects the movement value. The reconfiguration process section 106 corrects and reconfigures a portion where the partial images are overlapped based on the detected movement value (S63).

Reconfiguration is executed as follows. The image corresponding to the movement value that is not overlapped with the partial image that is input later (present frame) is separated from the partial image that is input before (old frame) and stored in the work area 23 of the RAM 2. Next, the overlapping process section overlaps the images at the overlapped portion of the old frame and the present frame and the overlapped images are stored in the work area 23 of the RAM 2.

The fingerprint characteristic extracting section 110 extracts the characteristics from the reconfigured partial image (S64) and the characteristics are stored in the input characteristic information memory 21 (S65). Details of the characteristic information extracting process will be explained later.

It is judged whether the characteristic information stored in the input characteristic information memory 21 is more than or equal to a predetermined length (for example 500 lines) (S66). If the characteristic information stored in the input characteristic information memory 21 is smaller than the predetermined amount, the comparison and the verification are difficult and an error is caused. The process is terminated and returns to the main routine (S66:NO). If the characteristic information stored in the characteristic information memory 21 is more than or equal to the predetermined amount (S66:YES), DP comparison (dynamic programming method) is executed by the verification process section 114 between the characteristic information stored in the input characteristic information memory 21 and the characteristic information stored in the registered characteristic information memory 40 of the EEP-ROM 4 (S67).

The DP comparison (dynamic programming method) is called as DP matching or rubber matching. The DP comparison is widely known. In the DP comparison, matching can be executed smoothly for the varied data. The DP comparison is an algorism where in the two lines of reference data and test data are put on an x-y plane to select a time sequence so that the accumulated distance becomes smallest with taking distance difference of the real data into consideration.

In this embodiment, LPC cepstrum (that will be explained later) obtained in the characteristic information extracting process (that will be explained later) of S64 is considered as spectrum data for every fingerprint line. The LPC cepstrum obtained from the input fingerprint image is aligned with the vertical direction of the fingerprint image and the aligned data is considered as test data. The LPC cepstrum stored in the registered characteristic information memory 40 of the EEP-ROM 4 is aligned with the vertical direction of the fingerprint image is considered as reference data. The degree of matching is obtained between the test data and the reference data.

The input speed change and the change degree are different between the reference data and the test data. Taking the difference into consideration, the correspondence in the vertical direction is searched by the DP comparison so that the reference data and the test data are closest at the end. At the closest vertical correspondence, the matching degree is output as a distance value. If the distance value becomes smaller, the difference between the LPC cepstrum of the reference data and of the test data is small. If the distance value becomes larger, the difference between the LPC cepstrum of the reference data and of the test data is large.

The judgment section 115 compares the distance value obtained by the DP comparison with a threshold that is previously set. It is judged that the fingerprint is identified if the distance value is smaller than the threshold and it is judged that the fingerprint is not identified if the distance value is larger than the threshold (S68). If not identified, the registered fingerprint is not erased from the registered characteristic information memory 40 of the EEP-ROM 4 and the process is terminated and returns to the main routine (S69:NO). If identified, the characteristic information of the registered fingerprint that is identified is erased from the registered characteristic information memory 40 of the EEP-ROM 4 (S70).

Figure 12:
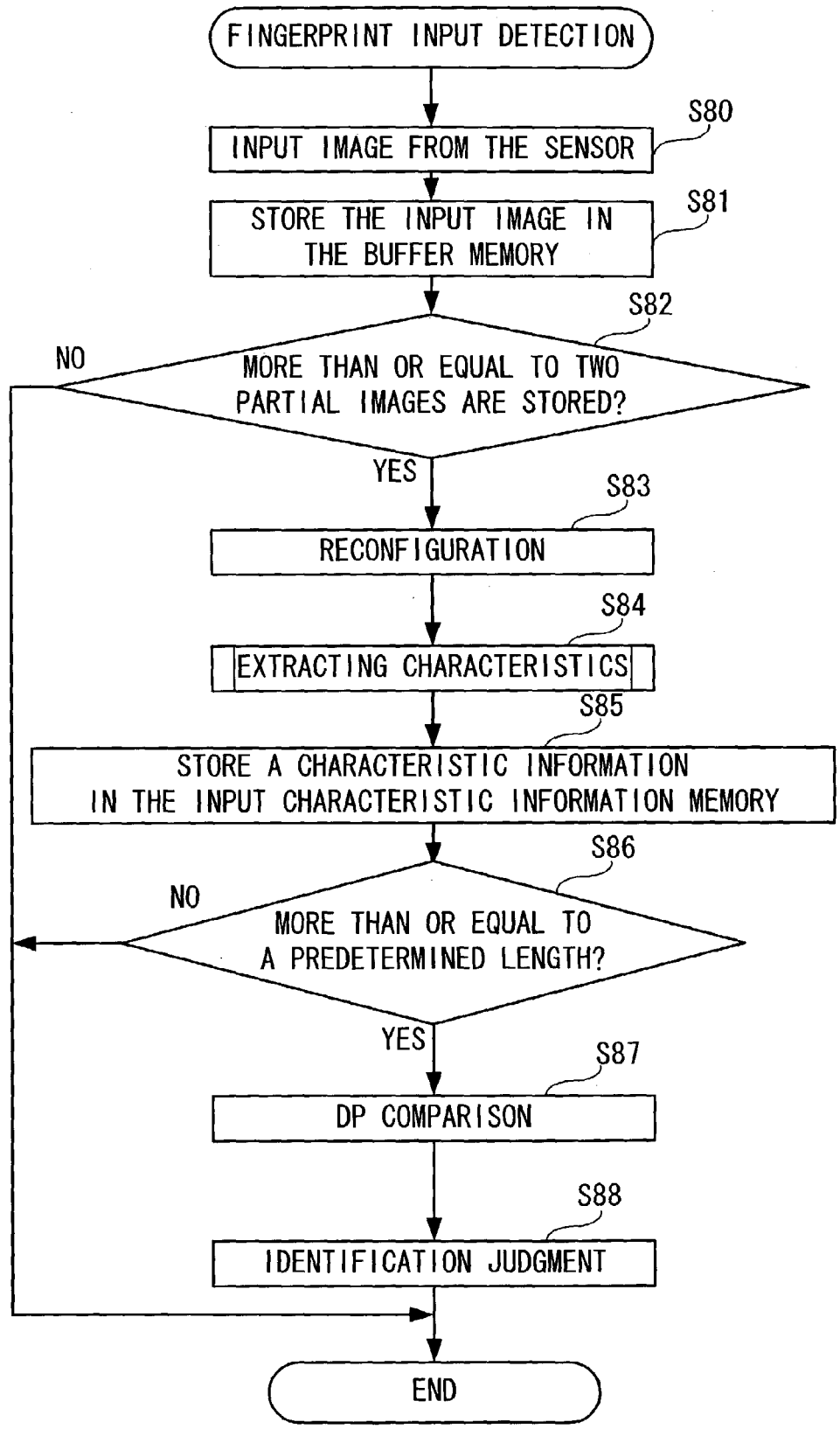
FIG. 12 is a flowchart showing details of a fingerprint input detection process.

FIG. 12 is a flowchart showing details of the fingerprint input detection process that is executed at S46 in FIG. 9. When a finger is placed on the fingerprint input device 7 and the finger is moved in its longitudinal direction, a partial image shown in FIG. 6 is input from the sensor (S80). The sensor detects the input for every predetermined time (more than or equal to 200 times a second in this embodiment). One or a plurality of partial images are input depending on the speed at which the finger is moved.

The input partial image is stored in the partial image buffer memory 20 (S81). If the input of only one partial image is detected and only one partial image is stored in the partial image buffer memory 20, an error is caused and the process is terminated and returns to the main routine (S82: NO). If a plurality of partial images are stored in the partial image buffer memory 20 (S82:YES), the movement value is detected by the movement value detection section 104. The overlapped portion of the partial image is corrected and reconfigured by the reconfiguration process section 106 based on the detected movement value (S83).

Reconfiguration is executed as follows. The image corresponding to the movement value that is not overlapped with the partial image that is input later (present frame) is separated from the partial image that is input before (old frame) and stored in the work area 23 of the RAM 2. Next, the overlapping process section overlaps the images at the overlapped portion of the old frame and the present frame and the overlapped images are stored in the work area 23 of the RAM 2. The fingerprint characteristic extracting section 110 extracts the characteristics from the reconfigured partial image (S84) and the characteristics are stored in the input characteristic information memory 21 (S85). Details of the characteristic information extracting process will be explained later.

It is judged whether the characteristic information stored in the input characteristic information memory 21 is more than or equal to a predetermined length (for example 500 lines) (S86). If the characteristic information stored in the input characteristic information memory 21 is smaller than the predetermined amount, the comparison and the verification are difficult and an error is caused. The process is terminated and returns to the main routine (S86:NO). If the characteristic information stored in the characteristic information memory 21 is more than or equal to the predetermined amount (S86:YES), DP comparison (dynamic programming method) is executed by the verification process section 114 between the characteristic information stored in the input characteristic information memory 21 and the characteristic information stored in the registered characteristic information memory 40 of the EEP-ROM 4 (S87).

The judgment section 115 compares the distance value obtained by the DP comparison with a threshold that is previously set. It is judged that the fingerprint is identified if the distance value is smaller than the threshold and it is judged that the fingerprint is not identified if the distance value is larger than the threshold (S88). The process is terminated and returns to the main routine.

Figure 13:
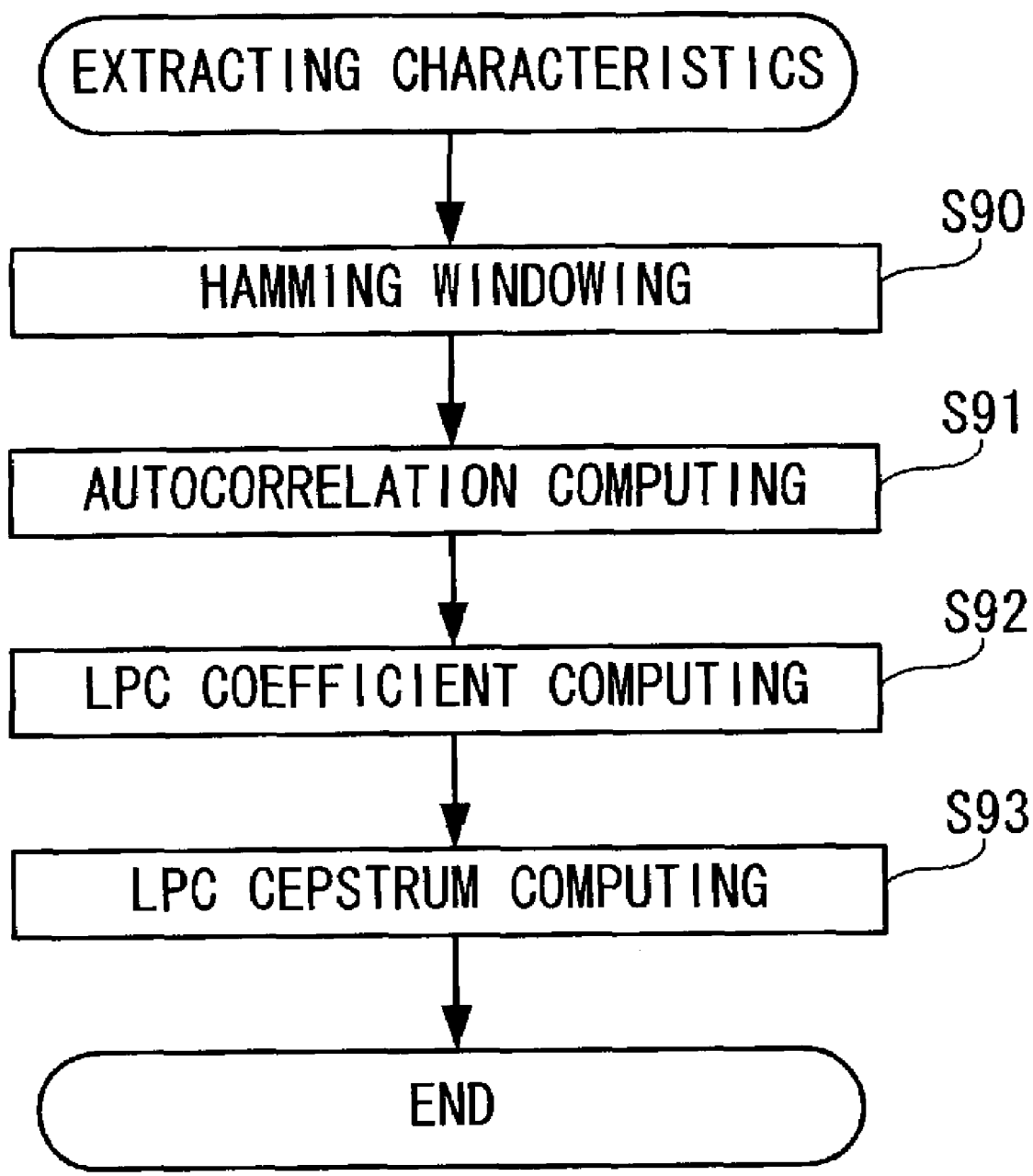
FIG. 13 is a flowchart showing details of a characteristics extracting process.

FIG. 13 is a flowchart showing details of the characteristic information extracting process that is executed at S54 of FIG. 10, S64 of FIG. 11 and S84 of FIG. 12. In this embodiment, the characteristics (minutia) are not extracted from the fingerprint. Information of the ridge is analyzed to obtain the characteristic information.

A line is extracted from the fingerprint image in alignment with its horizontal direction and the position of the fingerprint is represented in the horizontal direction and the density degree of the fingerprint is represented in the vertical direction to obtain a wave form signal. When the known analysis that is generally executed in the voice data process is executed to the waveform signal, power spectrum is obtained.

Each line of the reconfigured input partial image is considered as one frame and the extracting process is executed for each frame. As preprocessing, hamming windowing is executed (S90) to correct the end portions of the extracted frame. The auto correlation is obtained from the frame data that the correction process of the humming windowing is executed (S91).

The LPC coefficient is computed by the linear predictive coding (LPC) based on the obtained autocorrelation (S92). The linear predictive coding is known technology that is used for the voice compression such as in a portable phone. By the linear predictive coding, the voices such as vowels can be predicted with all pole transfer function and the peak frequency can be predicted from the spectrum.

The LPC coefficient obtained at S92 is computed with a linear combination operation to obtain the LPC cepstrum (S93). In this embodiment, the LPC cepstrum obtained during the characteristic information extracting process is stored in the input characteristic information memory 21 of the RAM 2 as the characteristic information (S55, S65, S85).

In this embodiment, the linear predictive coding (LPC) is used for the frequency analysis computing process for extracting the characteristic information and the LPC cepstrum is extracted as the characteristic information. The frequency analysis computing process for extracting characteristic information is not limited to the LPC. For example, the known fast Fourier transform may be used for the frequency analysis computing process. The fast Fourier transform is an algorism that executes with high speed the computing process for computing the frequency component (spectrum) of the discrete Fourier transform that is a digital signal. The weighted LPC coefficient obtained at S92 is transformed with the fast Fourier transform to obtain a power spectrum and the obtained power spectrum is used as the characteristic information.

The known group delay spectrum may be used for the frequency analysis computing process used for extracting the characteristic information. The group delay spectrum is defined as the frequency differential of the phase spectrum in the power transfer function.

The number of elements of the arrangement is the obtained number subtracted one from the number of elements of the phase spectrum. The weighted LPC coefficient is transformed with the fast Fourier transform to obtain the power spectrum. The phase differential of the obtained power spectrum is obtained to obtain the group delay spectrum as the characteristic information.

As explained above, in the fingerprint verification apparatus of the embodiment, the characteristics (minutia) are not extracted from the fingerprint. Information of the ridge is considered as a waveform signal and processed by the frequency analysis computing process to obtain the characteristic information.

Therefore, the process time for extracting the characteristic information can be stable in regardless of the condition of the fingerprint. The characteristic information can be extracted form the partial image without storing the whole image of the fingerprint.

Therefore, compared to the conventional fingerprint verification method wherein the characteristic data is extracted from the whole image of the fingerprint, the verification can be executed with a small amount of memory and the fingerprint verification apparatus can be light and the process can be executed with high speed. Since it is not necessary to store the whole image of the fingerprint, it can be prevented to cause a problem of security such as electronic copy of a fingerprint.

Since the characteristic information is extracted from the partial image, the overlapping of the extracting process may be caused by the overlapping of the input images. However, the overlapping of the extracting process is prevented by the reconfiguration of the images. Since the characteristic information is extracted from the partial image, the input characteristic information may be different from the registered characteristic information for every input of the fingerprint, however, the difference is absorbed by executing the DP comparison (DP matching) and verification is executed.

The present invention may be modified in many other specific forms. For example, in the above embodiment, the present invention is applied to an electronic lock, however, the present invention may be applied to other various apparatuses for verifying fingerprints. In the above embodiment, the fingerprint verification program is stored in the ROM 3, however, it is not limited thereto. The fingerprint verification program may be stored in the storing medium that can be read by a computer such as a floppy disc or a CD-ROM, or may be sent via a network such as internet.

INDUSTRIAL APPLICABILITY

As described above, the fingerprint verification apparatus, the fingerprint verification method and the fingerprint verification program of the present invention are preferable to be used for a various apparatus for verifying fingerprints. Particularly, the present invention is preferable to be used in an electronic lock that is unlocked by the fingerprint verification, an electronic apparatus that starts to be operated by the fingerprint verification or an information terminal such as portable phone that verify fingerprints.

The invention claimed is:

1. A fingerprint verification apparatus for verifying a fingerprint based on an input image of a fingerprint comprising:
    fingerprint input means for inputting a partial image of the fingerprint;
    image process means for comparing a plurality of partial images of fingerprints inputted by the fingerprint input means and reconfiguring individual partial images to remove an overlapped portion;
    characteristic information extracting means for computing and extracting characteristic information from a reconfigured partial image of the fingerprint, where any overlapped portion is removed by the image process means; and
    identifying means for identifying the fingerprint on the basis of the characteristic information of the partial image of the fingerprint extracted by the characteristic information extracting means,
    wherein at least two of the inputting the partial image of the fingerprint, removing the overlapped portion, and extracting the characteristic information are performed simultaneously.

2. The fingerprint verification apparatus according to claim 1, further comprising storing means for storing a characteristic information of at least one partial image, wherein the identifying means compares and verifies at least one characteristic information stored by the storing means with at least one characteristic information that is extracted by the characteristic information extracting means to identify the fingerprint.

3. The fingerprint verification apparatus according to claim 1, wherein the characteristic information extracting means executes a frequency analysis computing process to extract frequency spectrum information of the partial image of the fingerprint as the characteristic information.

4. The fingerprint verification apparatus according to claim 3, wherein the characteristic information extracting means uses one of a linear predictive coding (LPC) computing process, a group delay spectrum (GDS) computing process and a fast Fourier transform (FFT) computing process as the frequency analysis computing process.

5. The fingerprint verification apparatus according to claim 1, wherein the fingerprint input means inputs a line image of one or more image lines as a partial image of a fingerprint and the image process means detects an overlapped image line in the two partial images of fingerprints that are continuously input by the fingerprint input means and removes the overlapped image line from one of the two partial images of fingerprints.

6. The fingerprint verification apparatus according to claim 1, wherein the image process means executes an image size contraction process in at least one of a raster direction and a line direction of the partial image of the fingerprint where the overlapped portion is removed.

7. The fingerprint verification apparatus according to claim 3, wherein the identifying means uses a DP method (dynamic programming method).

8. A fingerprint verification method for verifying a fingerprint based on an input image of a fingerprint comprising:
    a fingerprint inputting step of inputting a partial image of the fingerprint;
    an image processing step of comparing a plurality of partial images of fingerprints inputted at the fingerprint inputting step and reconfiguring individual partial images to remove an overlapped portion;
    a characteristic information extracting step of computing and extracting a characteristic information from a reconfigured partial image of the fingerprint, where any overlapped portion is removed at the image processing step; and
    an identifying step of identifying the fingerprint on the basis of the characteristic information of the partial image of the fingerprint extracted at the characteristic information extracting step,
    wherein at least two of the fingerprint inputting step, the image processing step, and the characteristic information extracting step are performed simultaneously.

9. The fingerprint verification method according to claim 8, further comprising a storing step of storing a characteristic information of at least one partial image, wherein at the identifying step at least one characteristic information stored at the storing step is compared and verified with at least one characteristic information that is extracted at the characteristic information extracting step to identify the fingerprint.

10. The fingerprint verification method according to claim 8, wherein at the characteristic information extracting step a frequency analysis computing process is executed to extract frequency spectrum information of the partial image of the fingerprint as the characteristic information.

11. The fingerprint verification method according to claim 10, wherein at the characteristic information extracting step one of linear predictive coding (LPC) computing process, a group delay spectrum (GDS) computing process and a fast Fourier transform (FFT) computing process is used as the frequency analysis computing process.

12. The fingerprint verification method according to claim 8, wherein at the fingerprint inputting step a line image of one or more image lines is input as a partial image of a fingerprint and at the image processing step an overlapped image line is detected in the two partial images of fingerprints that are continuously input at the fingerprint inputting step and the overlapped image line is removed from one of the two partial images of fingerprints.

13. The fingerprint verification method according to claim 8, wherein at the image processing step an image size contraction process is executed in at least one of a raster direction and a line direction of the partial image of the fingerprint where the overlapped portion is removed.

14. The fingerprint verification method according to claim 10, wherein at the identifying step a DP method (dynamic programming method) is used.

15. A computer-readable medium that stores a fingerprint verification program for causing a computer to execute verification of a fingerprint based on an input image of a fingerprint comprising:
 a fingerprint inputting step of inputting a partial image of the fingerprint;
 an image processing step of comparing a plurality of partial images of fingerprints inputted at the fingerprint inputting step and reconfiguring individual partial images to remove an overlapped portion;
 a characteristic information extracting step of computing and extracting a characteristic information from a reconfigured partial image of the fingerprint, where any overlapped portion is removed at the image processing step; and
 an identifying step of identifying the fingerprint on the basis of the characteristic information of the partial image of the fingerprint extracted at the characteristic information extracting step,
 wherein at least two of the fingerprint inputting step, the image processing step, and the characteristic information extracting step are performed simultaneously.

16. The computer-readable medium according to claim 15, further comprising a storing step of storing a characteristic information of at least one partial image, wherein at the identifying step at least one characteristic information stored at the storing step is compared and verified with at least one characteristic information that is extracted at the characteristic information extracting step to identify the fingerprint.

17. The computer-readable medium according to claim 15, wherein at the characteristic information extracting step a frequency analysis computing process is executed to extract frequency spectrum information of the partial image of the fingerprint as the characteristic information.

18. The computer-readable medium according to claim 17, wherein at the characteristic information extracting step one of a linear predictive coding (LPC) computing process, a group delay spectrum (GDS) computing process and a fast Fourier transform (FFT) computing process is used as the frequency analysis computing process.

19. The computer-readable medium according to claim 15, wherein at the fingerprint inputting step a line image of one or more image lines is input as a partial image of a fingerprint and at the image processing step an overlapped image line is detected in the two partial images of fingerprints that are continuously input at the fingerprint inputting step and the overlapped image line is removed from one of the two partial images of fingerprints.

20. The computer-readable medium according to claim 15, wherein at the image processing step an image size contraction process is executed in at least one of a raster direction and a line direction of the partial image of the fingerprint where the overlapped portion is removed.

21. The computer-readable medium according to claim 17, wherein at the identifying step a DP method (dynamic programming method) is used.

22. The fingerprint verification apparatus according to claim 1, wherein the characteristic information extracting means extracts the characteristic information from an extracted line of a reconfigured partial image.

23. The fingerprint verification apparatus according to claim 1, wherein the inputting the partial image of the fingerprint and extracting the characteristic information are performed simultaneously.

24. The fingerprint verification method according to claim 8, wherein at the fingerprint inputting step and the characteristic information extracting step are performed simultaneously.

25. The computer-readable medium according to claim 17, wherein the fingerprint inputting step and the characteristic information extracting step are performed simultaneously.

* * * * *